(12) United States Patent
Furseth et al.

(10) Patent No.: US 7,540,895 B2
(45) Date of Patent: Jun. 2, 2009

(54) MULTIPLE FLOW FILTER SYSTEM

(75) Inventors: Michael R. Furseth, Sheboygan Falls, WI (US); Michael J. Connor, Stoughton, WI (US)

(73) Assignee: Fleetguard, Inc., Nashville, TN (US)

( * ) Notice: Subject to any disclaimer, the term of this patent is extended or adjusted under 35 U.S.C. 154(b) by 628 days.

(21) Appl. No.: 11/305,563

(22) Filed: Dec. 16, 2005

(65) Prior Publication Data

US 2007/0137155 A1    Jun. 21, 2007

(51) Int. Cl.
*B01D 46/00* (2006.01)
(52) U.S. Cl. .................. 55/385.3; 55/481; 55/484; 55/502; 123/198 E
(58) Field of Classification Search ............... 55/385.3, 55/481, 482, 498, 502, 510, DIG. 28, 483, 55/484; 96/134; 123/198 E; 60/299, 311
See application file for complete search history.

(56) References Cited

U.S. PATENT DOCUMENTS

| | | | |
|---|---|---|---|
| 3,873,287 A | 3/1975 | Barnebey | |
| 4,625,511 A * | 12/1986 | Scheitlin et al. | 60/299 |
| 4,861,359 A | 8/1989 | Tettman | |
| 5,223,011 A | 6/1993 | Hanni | |
| 5,431,706 A | 7/1995 | Paas | |
| 6,416,561 B1 * | 7/2002 | Kallsen et al. | 55/482 |
| 6,482,247 B2 | 11/2002 | Jaroszczyk et al. | |
| 6,511,599 B2 | 1/2003 | Jaroszczyk et al. | |
| 6,641,637 B2 | 11/2003 | Kallsen et al. | |
| 7,041,146 B2 * | 5/2006 | Bugli et al. | 55/481 |
| 2002/0029693 A1 * | 3/2002 | Sakakibara et al. | 96/134 |
| 2002/0033010 A1 * | 3/2002 | Schorn | 55/385.3 |
| 2008/0110146 A1 * | 5/2008 | Germain et al. | 55/385.3 |

\* cited by examiner

*Primary Examiner*—Duane Smith
*Assistant Examiner*—Minh-Chau T Pham
(74) *Attorney, Agent, or Firm*—Andrus, Sceales, Starke & Sawall, LLP; J. Bruce Schelkopf

(57) ABSTRACT

A filter includes a housing with multiple flow passages and filter elements, including at least first and second flow passages therethrough including respective first and second filter elements in parallel. Respective internal dividing walls separate flow passages in space saving relation.

16 Claims, 3 Drawing Sheets

MULTIPLE FLOW FILTER SYSTEM

BACKGROUND AND SUMMARY

The invention relates to filters, including air cleaners.

The invention arose during continuing development efforts directed toward filter assemblies providing more efficient use of space and better performance, including smaller package size and more flexibility in package geometry. The present system provides more filter media area in a given volume.

DETAILED DESCRIPTION

Figure 1:
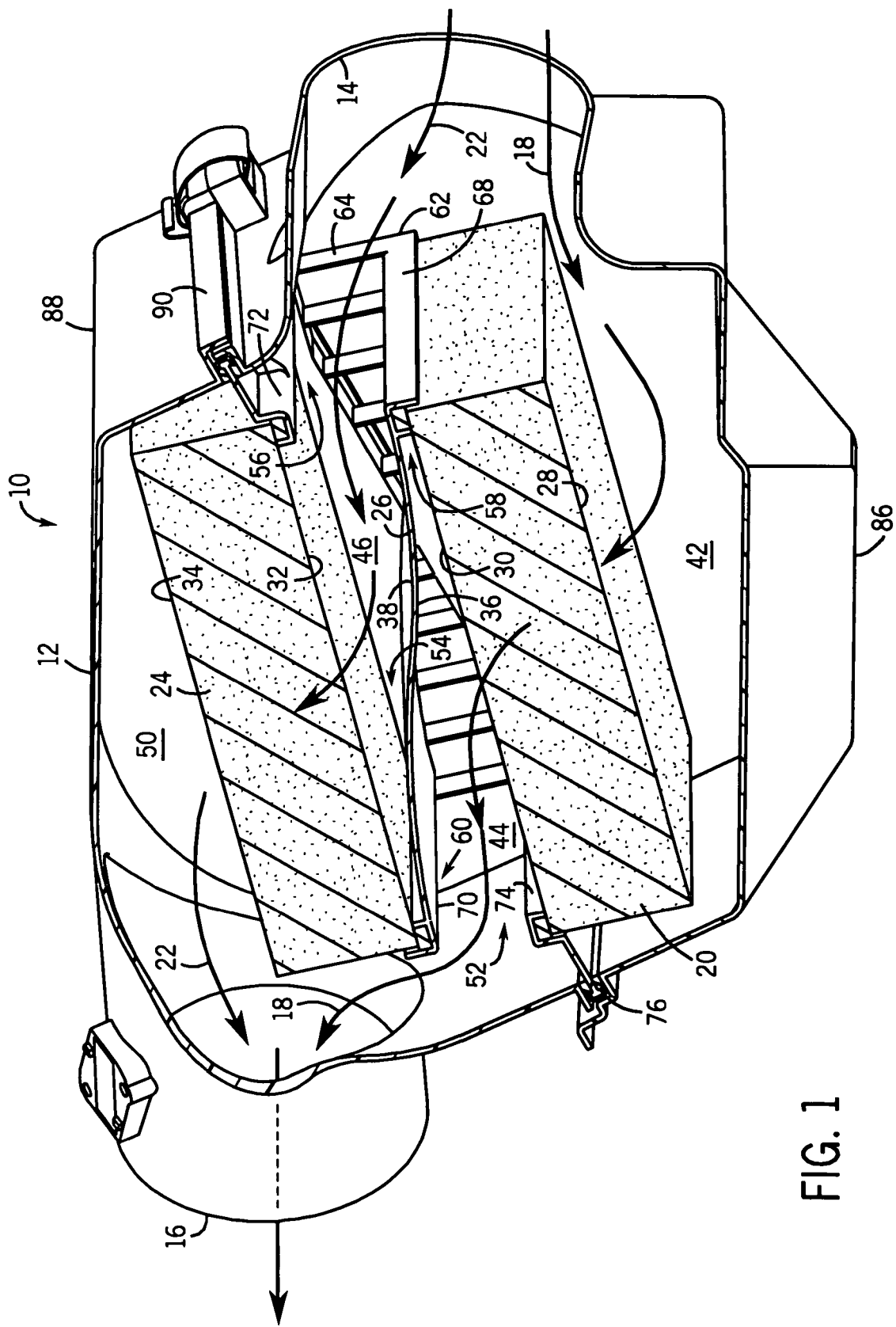
FIG. 1 is perspective cut-away view of a filter constructed in accordance with the invention.
Figure 2:
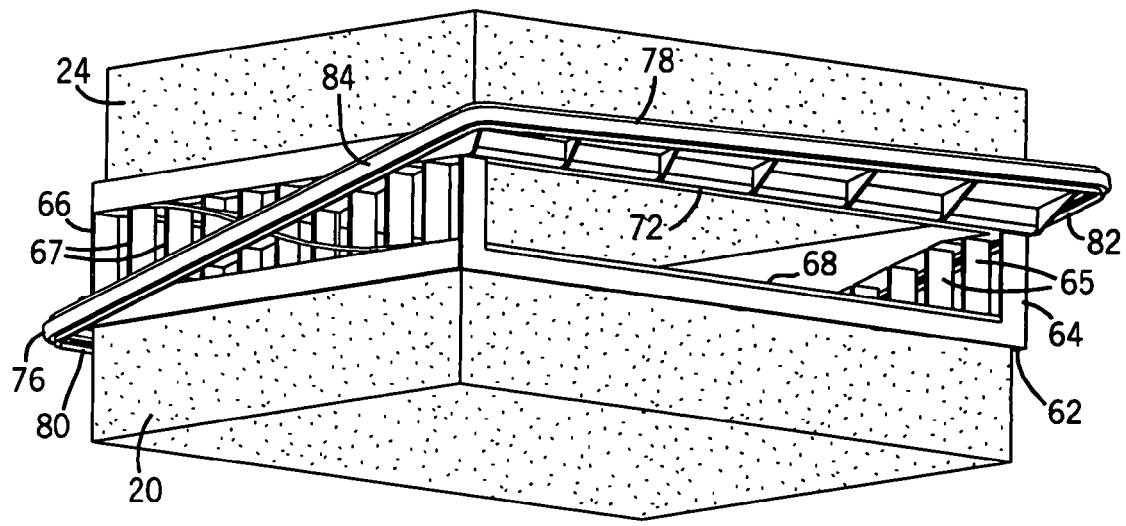
FIG. 2 is a perspective view of a portion of the assembly of FIG. 1.
Figure 3:
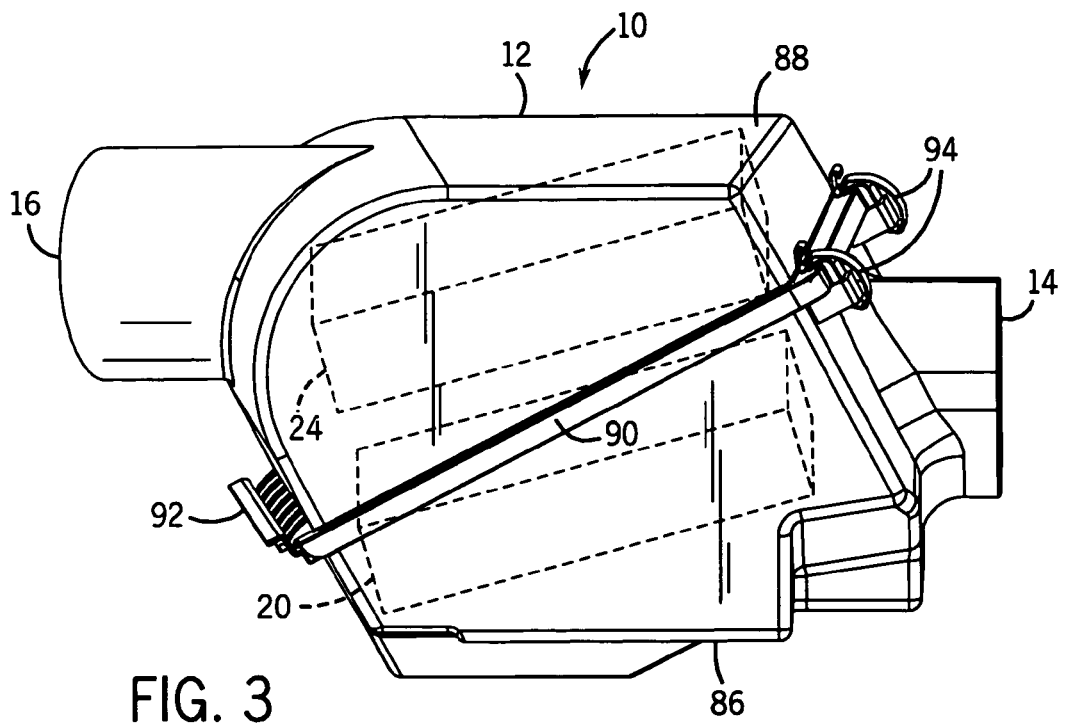
FIG. 3 is a perspective view of the housing of the assembly of FIG. 1.

FIGS. 1-3 show a filter 10 including a housing 12 having an inlet 14 and an outlet 16. A first flow passage 18 is provided through the housing from inlet 14 to outlet 16, and includes a first filter element 20 filtering fluid flowing along first flow passage 18. A second flow passage 22 is provided through the housing from inlet 14 to outlet 16, and includes a second filter element 24 filtering fluid flowing along second flow passage 22. First and second flow passages 18 and 22 are in parallel with each other such that incoming fluid flow at inlet 14 is split into first and second parallel flow paths in first and second flow passages 18 and 22, respectively, and flows through first and second filter elements 20 and 24, respectively, and re-joins at outlet 16. First and second flow passages 18 and 22 through respective first and second filter elements 20 and 24 are independent of each other.

Housing 12 includes an internal dividing wall 26 separating first and second flow passages 18 and 22 such that fluid in first flow passage 18 flows through first filter element 20 to the exclusion of and bypassing second filter element 24, and such that fluid in second flow passage 22 flows through second filter element 24 to the exclusion of and bypassing first filter element 20. First filter element 20 has an upstream face 28 receiving incoming fluid along first flow passage 18 from inlet 14. First filter element 20 has a downstream face 30 delivering filtered fluid along first flow passage 18 to outlet 16. Second filter element 24 has an upstream face 32 receiving incoming fluid along second flow passage 22 from inlet 14. Second filter element 24 has a downstream face 34 delivering filtered fluid along second flow passage 22 to outlet 16. Internal dividing wall 26 has a first surface 36 facing downstream face 30 of first filter element 20. Internal dividing wall 26 has a second surface 38 facing oppositely to first surface 36 and facing upstream face 32 of second filter element. Housing 12 has a first sidewall 40 defining a first plenum 42 between first sidewall 40 and upstream face 28 of first filter element 20. Internal dividing wall 26 has the noted first surface 36 defining a second plenum 44 between surface 36 of internal dividing wall 26 and downstream face 30 of first filter element 20. Internal dividing wall 26 has the noted second surface 38 defining a third plenum 46 between surface 38 of internal dividing wall 26 and upstream face 32 of second filter element 24. Housing 12 has a second sidewall 48 defining a fourth plenum 50 between housing sidewall 48 and downstream face 34 of second filter element 24.

In the preferred embodiment, first and second sidewalls 40 and 48 of the housing are spaced by first filter element 20, internal dividing wall 26, and second filter element 24 respectively in serial spatial alignment therewith. Further in the preferred embodiment, housing sidewalls 40 and 48 are spaced by first plenum 42, first filter element 20, second plenum 44, internal dividing wall 26, third plenum 46, second filter element 24, and fourth plenum 50 respectively in serial spatial alignment therewith. First and third plenums 42 and 46 communicate with each other at inlet 14. Second and fourth plenums 44 and 50 communicate with each other at outlet 16.

First and second filter elements 20 and 24 are spaced from each other by a gap 52. Internal dividing wall 26 is a diagonal wall which diagonally spans gap 52 and defines an upstream triangular shaped plenum 46 having a closed corner end 54 at upstream face 32 of second filter element 24, and having an open end 56 communicating with inlet 14. Diagonal wall 26 also defines a downstream triangular shaped plenum 44 having a closed corner end 58 at downstream face 30 of first filter element 20, and having an open end 60 communicating with outlet 16. In the preferred embodiment, diagonal wall 26 has a non-rectilinear wave shape providing increased entrance area at upstream open end 56 of triangular shaped plenum 46 and reduced area at closed corner end 54 of triangular shaped plenum 46, and providing increased exit area at downstream open end 60 of triangular shaped plenum 44 and reduced area at closed corner end 58 of triangular shaped plenum 44.

A spacer 62 supports first and second filter elements 20 and 24 and maintains gap 52 therebetween. Spacer 62 has first and second spacer walls 64 and 66 extending transversely (up-down in FIGS. 1, 2) across gap 52, and extending longitudinally (left-right in FIGS. 1, 2) between open ends 56 and 60 of upstream and downstream triangular shaped plenums 46 and 44. Spacer walls 64 and 66 are laterally spaced from each other by diagonal wall 26 therebetween. The spacer walls have upstream ends communicating with inlet 14, and have downstream ends communicating with outlet 16. Spacer walls 64 and 66 extend longitudinally (left-right in FIGS. 1, 2) between such upstream and downstream ends. The upstream ends of spacer walls 64 and 66 are laterally spaced by open end 56 of upstream triangular shaped plenum 46 therebetween. The downstream ends of spacer walls 64 and 66 are laterally spaced by open end 60 of downstream triangular shaped plenum 44 therebetween. Diagonal wall 26 has an upstream end 68 spanning laterally between the upstream ends of spacer walls 64 and 66. Diagonal wall 26 has a downstream end 70 spanning laterally between the downstream ends of spacer walls 64 and 66. Spacer 62 has an upstream bridging portion 72 extending laterally between the upstream ends of spacer walls 64 and 66 and transversely spaced from upstream end 68 of diagonal wall 26 by open end 56 of upstream triangular shaped plenum 46 therebetween. Spacer 62 has a downstream bridging portion 74 extending laterally between the downstream ends of spacer walls 64 and 66 and spaced transversely from downstream end 70 of diagonal wall 26 by open end 60 of downstream triangular shaped plenum 44 therebetween. The spacer walls may be solid, or may be provided by a plurality of transversely extending ribs 65, 67, respectively, as shown.

A gasket 76, FIG. 2, seals first and second filter elements 20 and 24 and spacer 62 to housing 12. Gasket 76 has an upstream segment 78 extending along upstream bridging portion 72 of spacer 62, a downstream segment 80 extending along downstream bridging portion 74 of spacer 62, and a pair of laterally spaced diagonal side segments 82 and 84 extending diagonally along spacer walls 64 and 66 diagonally oppositely to the diagonal extension of diagonal wall 26. In FIGS.

1 and 2, diagonal side segments 82 and 84 of the gasket extend diagonally from upper right to lower left, whereas diagonal wall 26 extends diagonally from lower right to upper left. Housing 12 is provided by a pair of shrouds 86 and 88, FIGS. 1, 3 removably mated to each other along an interface 90 coincident with gasket 76 including diagonal side segments 82 and 84 of the gasket. Inlet 14 is in shroud housing section 86. Outlet 16 is in shroud housing section 88. The shrouds are removably mounted to each other, for example, by hinges or clips such as 92 at one end, and clamps such as 94 at the other end. The shrouds preferably pinch and compress gasket 76 therebetween along the entire perimeter thereof including gasket segments 78, 80, 82, 84.

Figure 4:
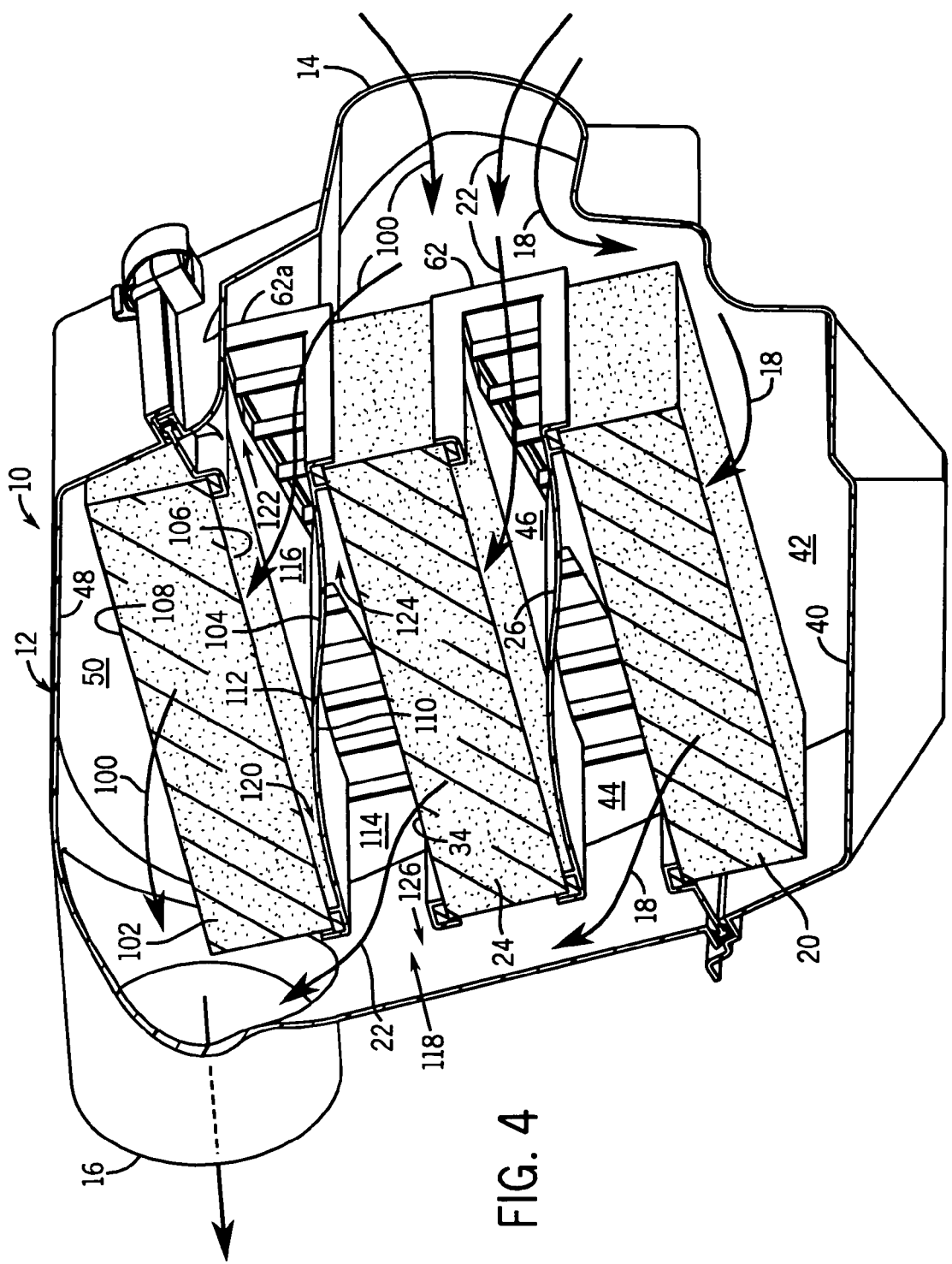
FIG. 4 is like FIG. 1 and shows a further embodiment.

The above principles may be applied to multiple flow filter systems wherein the filter housing may have multiple flow passages including the noted first and second flow passages and one or more additional flow passages therethrough. FIG. 4 shows a further embodiment and uses like reference numerals from above where appropriate to facilitate understanding. A third flow passage 100 is provided through housing 12 from inlet 14 to outlet 16, and includes a third filter element 102 filtering fluid flowing along third flow passage 100. First and second and third flow passages 18 and 22 and 100 are in parallel with each other such that incoming fluid flow at inlet 14 is split into first and second and third parallel flow paths in first and second and third flow passages 18 and 22 and 100, respectively, and flows through first and second and third filter elements 20 and 24 and 102, respectively, and re-joins at outlet 16. First and second and third flow passages 18 and 22 and 100 through respective first and second and third filter elements 20 and 24 and 102 are independent of each other. The housing has a second internal dividing wall 104 separating second and third flow passages 22 and 100. Fluid in first flow passage 18 flows through first filter element 20 to the exclusion of and bypassing second and third filter elements 24 and 102. Fluid in second flow passage 22 flows through second filter element 24 to the exclusion of and bypassing and first and third filter elements 20 and 102. Fluid in third flow passage 100 flows through third filter element 102 to the exclusion of and bypassing first and second filter elements 20 and 24. Third filter element 102 has an upstream face 106 receiving incoming fluid along third flow passage 100 from inlet 14, and a downstream face 108 delivering filtered fluid along third flow passage 100 to outlet 16. Second internal dividing wall 104 has a first surface 110 facing downstream face 34 of second filter element 24, and a second surface 112 facing oppositely to first surface 110 and facing upstream face 106 of third filter element 102. Internal dividing wall 104 has the noted first surface 110 defining a plenum 114 between surface 110 and downstream face 34 of second filter element 24. Internal dividing wall 104 has the noted second surface 112 defining a plenum 116 between surface 112 and upstream face 106 of third filter element 102. Housing sidewalls 40 and 48 in FIG. 4 are spaced by first filter element 20, first internal dividing wall 26, second filter element 24, second internal dividing wall 104, and third filter element 102 respectively in serial spatial alignment therebetween. More specifically in FIG. 4, sidewalls 40 and 48 are spaced by plenum 42, first filter element 20, plenum 44, first internal dividing wall 26, plenum 46, second filter element 24, plenum 114, second internal dividing wall 104, plenum 116, third filter element 102, and plenum 50 respectively in serial spatial alignment therebetween. Plenums 42 and 46 and 116 communicate with each other and with inlet 14. Plenums 44 and 114 and 50 communicate with each other and with outlet 16. Second and third filter elements 24 and 102 are spaced from each other by a gap 118, by a second spacer 62a comparable to spacer 62. Internal dividing wall 104 is a diagonal wall which diagonally spans gap 118 and defines an upstream triangular shaped plenum 116 having a closed corner end 120 at upstream face 106 of third filter element 102, and having an open end 122 communicating with inlet 14. Diagonal wall 104 also defines a downstream triangular shaped plenum 114 having a closed corner end 124 at downstream face 34 of second filter element 24, and having an open end 126 communicating with outlet 16. Diagonal wall 104 preferably has a non-rectilinear wave shape providing increased entrance area at upstream open end 122 of triangular shaped plenum 116 and reduced area at closed corner end 120 of triangular shaped plenum 116, and providing increased exit area at downstream open end 126 of triangular shaped plenum 114 and reduced area at closed corner end 124 of triangular shaped plenum 114. Fourth, fifth, and so on, multiple filter elements and flow passages may be provided in accordance with the above teachings.

It is recognized that various equivalents, alternatives and modifications are possible within the scope of the appended claims.

What is claimed is:

1. A filter comprising:
   a housing having an inlet and an outlet;
   a first flow passage through said housing from said inlet to said outlet, and including a first filter element filtering fluid flowing along said first flow passage;
   a second flow passage through said housing from said inlet to said outlet, and including a second filter element filtering fluid flowing along said second flow passage;
   said first and second flow passages being in parallel with each other such that incoming fluid flow at said inlet is split into first and second parallel flow paths in said first and second flow passages, respectively, and flows through said first and second filter elements, respectively, and re-joins at said outlet,
   wherein:
   said housing comprises an internal dividing wall separating said first and second flow passages such that fluid in said first flow passage flows through said first filter element to the exclusion of and bypassing said second filter element, and such that fluid in said second flow passage flows through said second filter element to the exclusion of and bypassing said first filter element;
   said first filter element has an upstream face receiving incoming fluid along said first flow passage from said inlet, and a downstream face delivering filtered fluid along said first flow passage to said outlet;
   said second filter element has an upstream face receiving incoming fluid along said second flow passage from said inlet, and a downstream face delivering filtered fluid along said second flow passage to said outlet;
   said first and second filter elements are spaced from each other by a gap;
   said internal dividing wall comprises a diagonal wall which diagonally spans said gap and defines an upstream triangular shaped plenum having a closed corner end at said upstream face of said second filter element, and having an open end communicating with said inlet, and defines a downstream triangular shaped plenum having a closed corner end at said downstream face of said first filter element, and having an open end communicating with said outlet;
   said diagonal wall has a non-rectilinear wave shape providing increased entrance area at said open end of said upstream triangular shaped plenum and reduced area at said closed corner end of said upstream triangular shaped plenum, and providing increased exit area at said open end of said downstream triangular shaped plenum and reduced area at said closed corner end of said downstream triangular shaped plenum.

2. A filter comprising:

a housing having an inlet and an outlet;

a first flow passage through said housing from said inlet to said outlet, and including a first filter element filtering fluid flowing along said first flow passage;

a second flow passage through said housing from said inlet to said outlet, and including a second filter element filtering fluid flowing along said second flow passage;

said first and second flow passages being in parallel with each other such that incoming fluid flow at said inlet is split into first and second parallel flow paths in said first and second flow passages, respectively, and flows through said first and second filter elements, respectively, and re-joins at said outlet, wherein:

said housing comprises an internal dividing wall separating said first and second flow passages such that fluid in said first flow passage flows through said first filter element to the exclusion of and bypassing said second filter element, and such that fluid in said second flow passage flows through said second filter element to the exclusion of and bypassing said first filter element;

said first filter element has an upstream face receiving incoming fluid along said first flow passage from said inlet, and a downstream face delivering filtered fluid along said first flow passage to said outlet;

said second filter element has an upstream face receiving incoming fluid along said second flow passage from said inlet, and a downstream face delivering filtered fluid along said second flow passage to said outlet;

said first and second filter elements are spaced from each other by a gap;

said internal dividing wall comprises a diagonal wall which diagonally spans said gap and defines an upstream triangular shaped plenum having a closed corner end at said upstream face of said second filter element, and having an open end communicating with said inlet, and defines a downstream triangular shaped plenum having a closed corner end at said downstream face of said first filter element, and having an open end communicating with said outlet; and comprising a spacer supporting said first and second filter elements and maintaining said gap therebetween, said spacer comprising first and second spacer walls extending transversely across said gap and extending longitudinally between said open ends of said upstream and downstream triangular shaped plenums, said spacer walls being laterally spaced from each other by said diagonal wall therebetween, said spacer walls having upstream ends communicating with said inlet, and having downstream ends communicating with said outlet, said spacer walls extending longitudinally between said upstream ends and said downstream ends, said upstream ends of said spacer walls being laterally spaced by said open end of said upstream triangular shaped plenum therebetween, said downstream ends of said spacer walls being laterally spaced by said open end of said downstream triangular shaped plenum therebetween, said diagonal wall having an upstream end spanning laterally between said upstream ends of said spacer walls, said diagonal wall having a downstream end spanning laterally between said downstream ends of said spacer walls, said spacer having an upstream bridging portion extending laterally between said upstream ends of said spacer walls and transversely spaced from said upstream end of said diagonal wall by said open end of said upstream triangular shaped plenum therebetween, said spacer having a downstream bridging portion extending laterally between said downstream ends of said spacer walls and spaced transversely from said downstream end of said diagonal wall by said open end of said downstream triangular shaped plenum therebetween.

3. The filter according to claim 2 comprising a gasket sealing said first and second filter elements and said spacer to said housing, said gasket comprising an upstream segment extending along said upstream bridging portion, a downstream segment extending along said downstream bridging portion, and a pair of laterally spaced diagonal side segments extending diagonally along said spacer walls diagonally oppositely to the diagonal extension of said diagonal wall.

4. The filter according to claim 3 wherein said housing comprises a pair of shrouds removably mated to each other along an interface coincident with said gasket including said diagonal side segments of said gasket.

5. The filter according to claim 4 wherein said inlet is in one of said shrouds, and said outlet is in the other of said shrouds.

6. A filter comprising:

a housing having an inlet and an outlet;

a first flow passage through said housing from said inlet to said outlet, and including a first filter element filtering fluid flowing along said first flow passage;

a second flow passage through said housing from said inlet to said outlet, and including a second filter element filtering fluid flowing along said second flow passage;

said first and second flow passages being in parallel with each other such that incoming fluid flow at said inlet is split into first and second parallel flow paths in said first and second flow passages, respectively, and flows through said first and second filter elements, respectively, and re-joins at said outlet;

wherein said housing has multiple flow passages therethrough including said first flow passage and said second flow passage and at least one additional flow passage from said inlet to said outlet, each said flow passage including a respective filter element filtering fluid flowing along such flow passage.

7. The filter according to claim 6 wherein said multiple flow passages comprise a third flow passage through said housing from said inlet to said outlet, and including a third filter element filtering fluid flowing along said third flow passage, said first and second and third flow passages being in parallel with each other such that incoming fluid flow at said inlet is split into first and second and third parallel flow paths in said first and second and third flow passages, respectively, and flows through said first and second and third filter elements, respectively, and re-joins at said outlet.

8. The filter according to claim 7 wherein said first and second and third flow passages through said respective first and second and third filter elements are independent of each other.

9. The filter according to claim 7 wherein said housing comprises a first internal dividing wall separating said first and second flow passages, and a second internal dividing wall separating said second and third flow passages, such that fluid in said first flow passage flows through said first filter element to the exclusion of and bypassing said second and third filter elements, and such that fluid in said second flow passage flows through said second filter element to the exclusion of and bypassing said first and third filter elements, and such that fluid in said third flow passage flows through said third filter element to the exclusion of and bypassing said first and second filter elements.

10. The filter according to claim 9 wherein:
said first filter element has an upstream face receiving incoming fluid along said first flow passage from said inlet, and a downstream face delivering filtered fluid along said first flow passage to said outlet;
said second filter element has an upstream face receiving incoming fluid along said second flow passage from said inlet, and a downstream face delivering filtered fluid along said second flow passage to said outlet;
said third filter element has an upstream face receiving incoming fluid along said third flow passage from said inlet, and a downstream face delivering filtered fluid along said third flow passage to said outlet;
said first internal dividing wall has a first surface facing said downstream face of said first filter element, and a second surface facing oppositely to said first surface and facing said upstream face of said second filter element;
said second internal dividing wall has a first surface facing said downstream face of said second filter element, and a second surface facing oppositely to said first surface of said second internal dividing wall and facing said upstream face of said third filter element.

11. The filter according to claim 9 wherein:
said first filter element has an upstream face receiving incoming fluid along said first flow passage from said inlet, and a downstream face delivering filtered fluid along said first flow passage to said outlet;
said second filter element has an upstream face receiving incoming fluid along said second flow passage from said inlet, and a downstream face delivering filtered fluid along said second flow passage to said outlet;
said third filter element has an upstream face receiving incoming fluid along said third flow passage from said inlet, and a downstream face delivering filtered fluid along said third flow passage to said outlet;
said housing has a first sidewall defining a first plenum between said first sidewall and said upstream face of said first filter element;
said first internal dividing wall has a first surface defining a second plenum between said first surface and said downstream face of said first filter element;
said first internal dividing wall has a second surface facing oppositely to said first surface and defining a third plenum between said second surface and said upstream face of said second filter element;
said second internal dividing wall has a first surface defining a fourth plenum between said first surface of said second internal dividing wall and said downstream face of said second filter element;
said second internal dividing wall has a second surface facing oppositely to said first surface of said second internal dividing wall and defining a fifth plenum between said second surface of said second internal dividing wall and said upstream face of said third filter element;
said housing has a second sidewall defining a sixth plenum between said second sidewall and said downstream face of said third filter element.

12. The filter according to claim 11 wherein said first and second sidewalls are spaced by said first filter element, said first internal dividing wall, said second filter element, said second internal dividing wall, and said third filter element respectively in serial spatial alignment therebetween.

13. The filter according to claim 11 wherein said first and second sidewalls are spaced by said first plenum, said first filter element, said second plenum, said first internal dividing wall, said third plenum, said second filter element, said fourth plenum, said second internal dividing wall, said fifth plenum, said third filter element, and said sixth plenum respectively in serial spatial alignment therebetween.

14. The filter according to claim 11 wherein said first and third and fifth plenums communicate with each other and with said inlet, and said second and fourth and sixth plenums communicate with each other and with said outlet.

15. The filter according to claim 7:
said first filter element has an upstream face receiving incoming fluid along said first flow passage from said inlet, and a downstream face delivering fluid along said first flow passage to said outlet;
said second filter element has an upstream face receiving incoming fluid along said second flow passage from said inlet, and a downstream face delivering filtered fluid along said second flow passage to said outlet;
said third filter element has an upstream face receiving incoming fluid along said third flow passage from said inlet, and a downstream face delivering filtered fluid along said third flow passage to said outlet;
said first and second filter elements are spaced from each other by a first gap;
said second and third filter elements are spaced from each other by a second gap;
said first internal dividing wall comprises a first diagonal wall which diagonally spans said first gap and defines a first upstream triangular shaped plenum having a closed corner end at said upstream face of said second filter element, and having an open end communicating with said inlet, and defines a first downstream triangular shaped plenum having a closed corner end at said downstream face of said first filter element, and having an open end communicating with said outlet;
said second internal dividing wall comprises a second diagonal wall which diagonally spans said second gap and defines a second upstream triangular shaped plenum having a closed corner end at said upstream face of said third filter element, and having an open end communicating with said inlet, and defines a second downstream triangular shaped plenum having a closed corner end at said downstream face of said second filter element, and having an open end communicating with said outlet.

16. The filter according to claim 15 wherein:
said first diagonal wall has a non-rectilinear wave shape providing increased entrance area at said open end of said first upstream triangular shaped plenum and reduced area at said closed corner end of said first upstream triangular shaped plenum, and providing increased exit area at said open end of said first downstream triangular shaped plenum and reduced area at said closed corner end of said first downstream triangular shaped plenum;
said second diagonal wall has a non-rectilinear wave shape providing increased entrance area at said open end of said second upstream triangular shaped plenum and reduced area at said closed corner end of said second upstream triangular shaped plenum, and providing increased exit area at said open end of said second downstream triangular shaped plenum and reduced area at said closed corner end of said second downstream triangular shaped plenum.

* * * * *